United States Patent [19]

Dias

[11] Patent Number: 5,025,790
[45] Date of Patent: Jun. 25, 1991

[54] GRADED FREQUENCY SENSORS

[75] Inventor: J. Fleming Dias, Palo Alto, Calif.

[73] Assignee: Hewlett-Packard Company, Palo Alto, Calif.

[21] Appl. No.: 352,803

[22] Filed: May 16, 1989

[51] Int. Cl.⁵ .............................................. A61B 8/00
[52] U.S. Cl. ............................... 128/662.03; 310/336; 29/75.35
[58] Field of Search ...................... 128/660.01, 660.06, 128/660.07, 662.03; 310/336; 73/625, 626, 628; 29/25.35

[56] References Cited

U.S. PATENT DOCUMENTS 4,385,255  5/1983  Yamaguchi et al. ........ 128/662.03 X
4,478,085 10/1984  Sasaki ............................. 73/628 X
4,635,484  1/1987  Lerch .......................... 128/662.03 X

OTHER PUBLICATIONS

Marcel Arditi et al., "Transient Fields of Concave Annular Array", *Ultrasonic Imaging* 3, pp. 37-61 (1981).
M. Arditi et al., "An Annular Array System for High Resolution Breast Echography", *Ultrasonic Imaging* 4, pp. 1-31, (1982).

*Primary Examiner*—Francis Jaworski

[57]  ABSTRACT

A graded frequency ultrasonic sensor [10] that compensates for frequency downshifting [32] in the body is disclosed. The outer portion [20] of the sensor's aperture is sensitive to the lower frequency returns which are a consequence of the frequency downshifting. Therefore, the invention achieves a high degree of lateral resolution. The central portion [18, 59] of the sensor is made thinner than the outer portion ]20, 57], so that the central portion is resonant at a higher frequency than the outer portion. Lateral resolution is improved by using the largest possible aperture to receive the downshifted frequencies. Techniques for shaping graded arrays, and for applying impedance matching layers [48] are disclosed for both spherical shells [10] and linear arrays [72]. The invention can be applied to different shapes of sensors, including spherical shells [10] and linear arrays [72].

11 Claims, 4 Drawing Sheets

GRADED FREQUENCY SENSORS

BACKGROUND OF INVENTION

The present invention is an apparatus to improve the lateral resolution performance of ultrasonic sensor arrays, particularly when such arrays are used to achieve substantial penetration distances into a body or object under investigation, as in medical research, diagnosis and examination.

Ultrasonic imaging sensors for medical applications usually transmit frequencies in 4 to 5 megahertz range. However, because high frequencies are attenuated more rapidly than lower frequencies, the return signal received will have a lower frequency content than the transmitted signal. As shown in FIG. 3, a 5 Mhz input will be downshifted to 2.5 Mhz following a 27.5 cm round trip in the body.

Lateral resolution is a measurement of how closely two items can be located together and still be separated by an imaging sensor. The spacing which can be resolved is a direct function of wavelength divided by sensor aperture. Thus to achieve fine lateral resolution, it is necessary to use a short wavelength, a large aperture, or best of all, both. When the object being imaged is at some distance inside of an attenuating medium, the initial frequency is "downshifted" as it penetrates deeper into the body. Thus, the frequency returned will be lower than that transmitted into the body, and lateral resolution will be lower than expected. Downshifting is observed when, for example, an organ deep within the human body is imaged. The deeper the organ, the less lateral resolution can be achieved. It is extremely important to be able to achieve a high resolution of organs deep within the body.

There is a deeply felt need within this industry for a means of achieving good lateral resolution of targets which are deeply imbedded within an attenuating medium, such as organs within the human body. What actually occurs is that the high frequency portion of the signal is attenuated more rapidly than the lower frequencies, so that the return signal is shifted to much lower frequencies than the signal which was originally transmitted.

SUMMARY OF THE INVENTION

The graded frequency sensor disclosed and claimed in this patent application overcome the problems of limited lateral resolution due to the selective attenuation of high ultrasonic frequencies. The key to the improved performance achieved by the present invention is in the novel method of fabricating a sensor array with thickness steps, so that lower frequencies are preferentially received at the outer portion of the array. Two approaches are described. In the first approach, thickness steps are formed in a disc shaped sensor, which may be either a monolithic sensor or an annular array sensor. In the second approach, thickness steps are formed in a linear array sensor.

The result of the first approach is a disc-shaped sensor which is thin in the middle, and thicker at the periphery. It may have only one thickness change, or step, from the center to the periphery, as illustrated in FIG. 1; or it may have two or more thickness changes from the center to the periphery, as illustrated in FIG. 2. When there are two or more thickness changes, any step is thicker than all the more central steps and thinner than all the more peripheral steps.

The result of the second approach is a linear array having individual elements, the thickness of which varies in steps from the center to the ends of the array, with the thinner elements at the center, and progressively thicker elements toward the ends of the array.

In both approaches, the thickness of the sensor progressively grades from thin at the middle to thick at the periphery. Such a sensor array is called a graded frequency array, because the thickness steps, or gradations, result in a corresponding gradation in the frequency response of the ultrasonic sensor. It is well known in the art that the thickness of an ultrasonic sensor is an inverse function of its resonant frequency. That is, a thick sensor will have its maximum sensitivity at a lower frequency than a thin sensor will.

The Graded Frequency Sensor invention is an innovation method and apparatus that will improve the lateral resolution performance of ultrasonic sensors used in medical diagnostic and research applications.

An appreciation of other aims and objectives of the present invention and a more complete and comprehensive understanding of the invention may be achieved by studying the following description of a preferred embodiment and an alternative embodiment, and by referring to the accompanying drawings.

DESCRIPTION OF THE PREFERRED EMBODIMENT

Figure 1A:
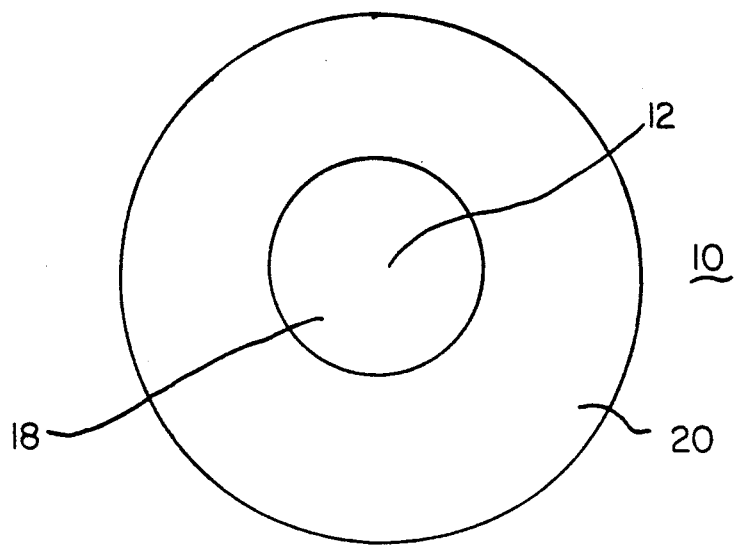
FIG. 1 is a sectional view through a sensor, cut from a spherical shell of piezoelectric material, in which the central portion of the spherical shell has been reduced in thickness.
Figure 1B:
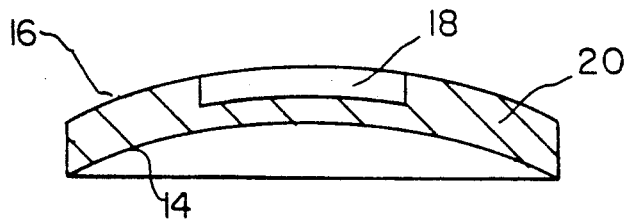

FIG. 1 is a cross sectional view of a graded frequency sensor, which depicts a preferred embodiment of the invention. The invention includes an ultrasonic sensor in the form of a single spherical shell[10], designed so that it has two more resonant frequencies. For such a sensor, the resonant frequency is the frequency of maximum sensitivity, and the two terms may be used interchangeably. In the present state of the art, the thickness of the shell is constant, so that all regions of the shell are resonant at the same frequency. The subject invention provides gradations of thickness so that the periphery of the shell is resonant at the lowest frequency expected to be received from the object being imaged, while the center of the shell is resonant at a higher frequency, corresponding to the frequency of the drive pulse at which ultrasonic energy is transmitted.

In order to produce such a graded frequency sensor, one can start with either a conventional shell of constant thickness, or an annular array of constant thickness. The peripheral section [16] is left unchanged, and the central section [18] is thinned so that the central section [18] is resonant at a higher frequency. The higher frequency is that at which energy is transmitted by the ultrasonic sensor. The original thickness, which is that of the periphery, is chosen to correspond to the downshifted frequency which will be received.

The central portion [18] is thinned by cutting material from the convex face [16], while leaving the concave free [14] unchanged. If one has started with an annular array, one or more of the central annuli can be included in the central portion [18] being thinned.

Figure 2:
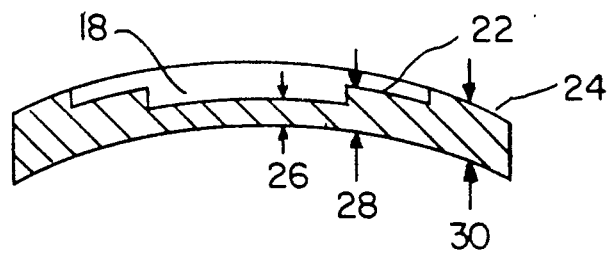
FIG. 2 is a sectional view through a sensor, cut from a spherical shell of piezoelectric material, having three different thickness, with the central portion being thinnest, and the outermost portion being thickest.
Figure 3:
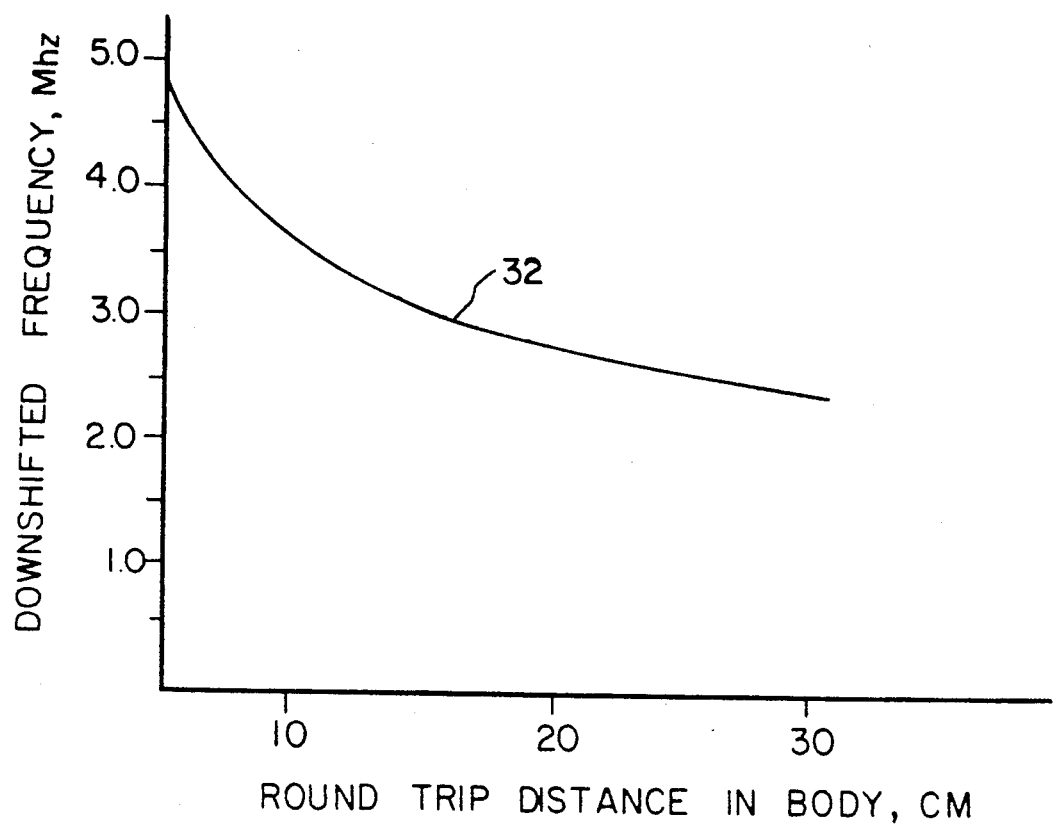
FIG. 3 illustrates how received energy is downshifted as it makes the round trip into the body, from transmitter to receiver.

The invention is not limited to one thickness change. FIG. 2 illustrates a sensor having three different thicknesses. The thickness [30] of the outermost region of the shell [24] is left unchanged, that of the intermediate section [22] is reduced [28], and that of the innermost section [18] is reduced still further [26]. The number of thickness steps can be increased further, resulting in a corresponding increase in the number of resonant frequencies.

Figure 4:
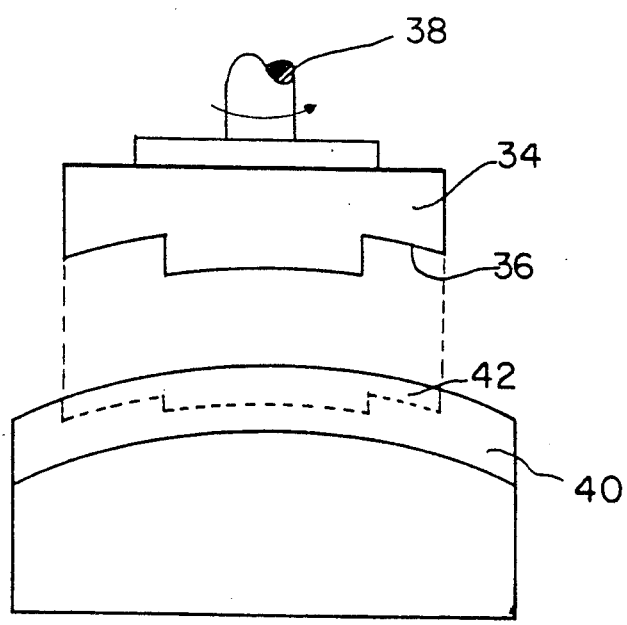
FIG. 4 illustrates how a special tool might be used to generate the stepped shell of FIG. 2.

FIG. 4 indicates a tool which could be used to shape the spherical shell [10]. The tool consists of a circularly symmetric cutter [34] driven in rotation by a shaft [38], and having a stepped concave cutting surface [36], whose shape is complementary to that of the desired sensor shape. An abrasive, such as diamond dust, is used to cut into the convex surface of the spherical shell [40], producing the graded surface [42].

Figure 5:
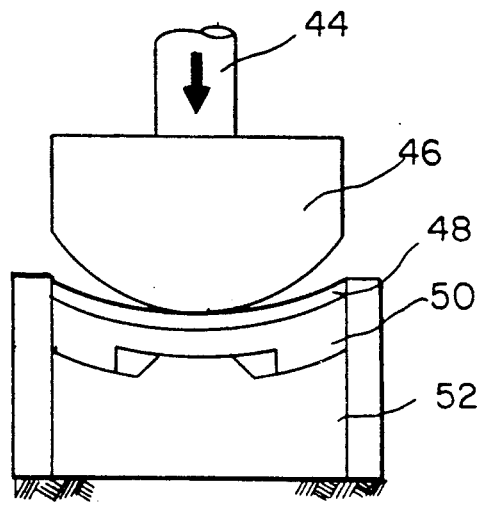
FIG. 5 illustrates tooling which might be used to match am impedance matching layer, of uniform thickness, to the concave surface of the sensor of FIG. 4.

FIG. 5 shows tooling which could be used to bond an impedance matching layer [48] of constant thickness to the concave surface of the graded sensor [50]. The graded sensor [50] is backed by a support structure [52] which closely fits its stepped convex surface. The impedance matching layer is coated with bonding material and placed in contact with the concave surface of the sensor [50]. Linear drive shaft [44] drives flexible ram [46] into tight contact with the impedance matching layer [48], thereby helping to bond it to the sensor [50].

Figure 6:
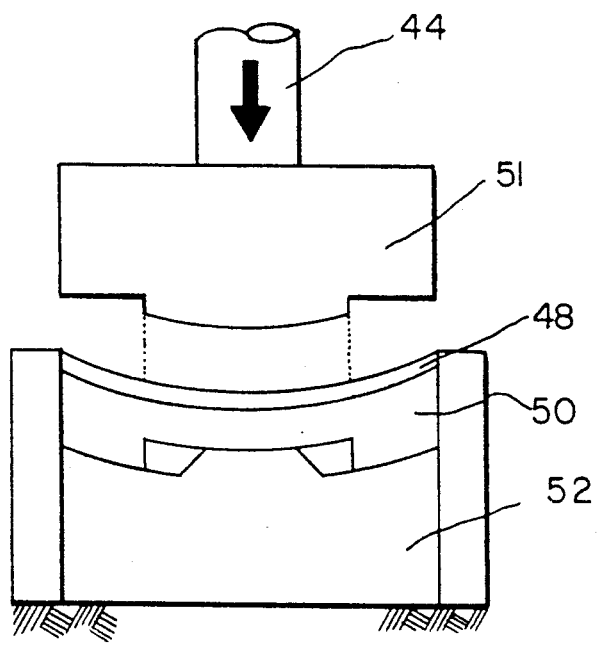
FIG. 6 illustrates tooling which might be used to modify the thickness of the impedance matching layer, so that its thickness corresponds to the resonant frequency of that portion of the sensor where it is applied.
Figure 7:
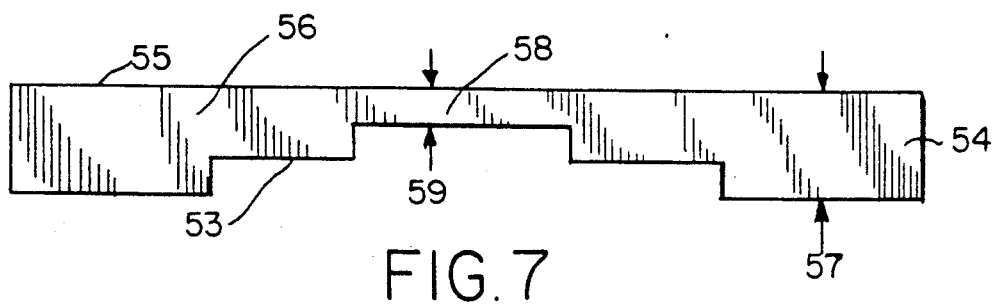
FIG. 7 is a section through the backing of a linear array, showing a backing of graded thickness. The backing is graded so that it is thinner at the periphery. Sensor elements have not yet been attached to the backing.
Figure 8:
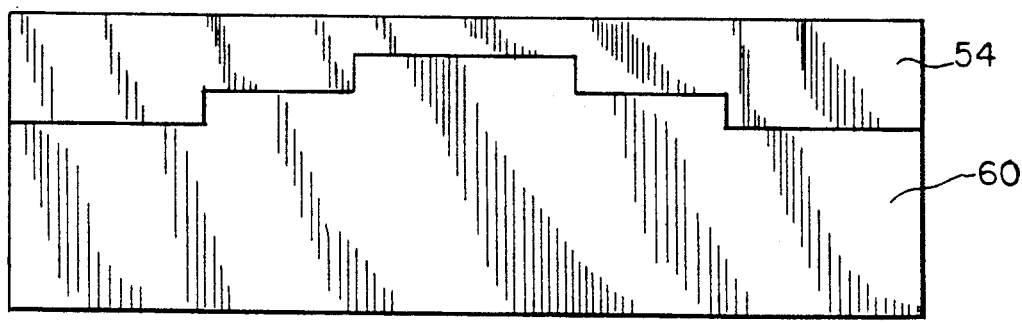
FIG. 8 shows individual sensor elements added to the backing, thereby producing a linear array.

FIG. 6 illustrates how the thickness of the impedance matching layer [48] could be graded to correspond to the thickness of the underlying section of the sensor [58]. Such grading is necessary because the impedance matching layer [48] should be a quarter-wavelength thick to properly match the sensor's impedance. A tool [54] is pressed against impedance matching layer [48] by linear drive shaft [44]. The convex surface of the tool [51] is designed to thin impedance matching layer [48] more in the central portion than at the periphery. The shell [50] is supported by support structure [52].

DESCRIPTION OF AN ALTERNATIVE EMBODIMENT

In the alternative embodiment of this invention, an ultrasonic sensor is designed in the form of a linear array [54], having two or more resonant frequencies. The steps in fabricating such an a linear array are shown in FIGS. 7 through 10. Prior to this invention, the thickness of each element in the array would be constant, so that all elements of the array would be resonant at the same frequency. In the alternative embodiment of the invention, a linear array [54] is fabricated from a rectangular block of piezoelectric material [54], so that those individual sensors [64] in the central portion of the block [58] are thinnest, and those in the outermost portion of the block [70] are thickest.

In a conventional linear array, the elements are arranged on a planar backing, typically an epoxy material. However, in the alternative embodiment, the shape of the backing [60] is complementary to the steps [56,58] in the piezoelectric block [54].

Figure 9:
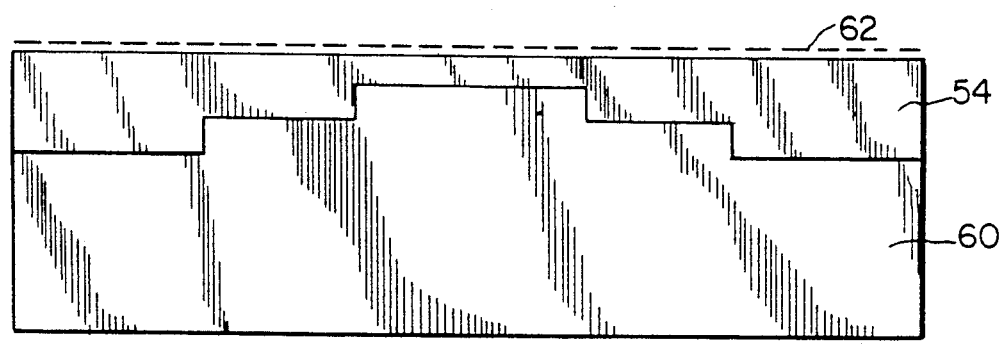
FIG. 9, the front surface of the linear array has been ground flush. After this step, the sensor elements at the periphery of the array are thicker than those in the center, and a graded linear array results.

The backing may be attached to the steps surface of the piezoelectric block [54] by pouring. The backing provides a rigid support for the block [54] during subsequent operations, and it may provide desired acoustic attenuation. The front surface of the block [55] is lapped to the desired thickness by removing some material [62], as shown in FIG. 9. Then the front surface is cut into individual array elements [64] by a series of saw slots [66]. Each slot [66] extends into the backing ]60] a distance approximately equal to the size of a step. The cuts [66] minimize the cross-coupling between array elements [64].

Figure 10:
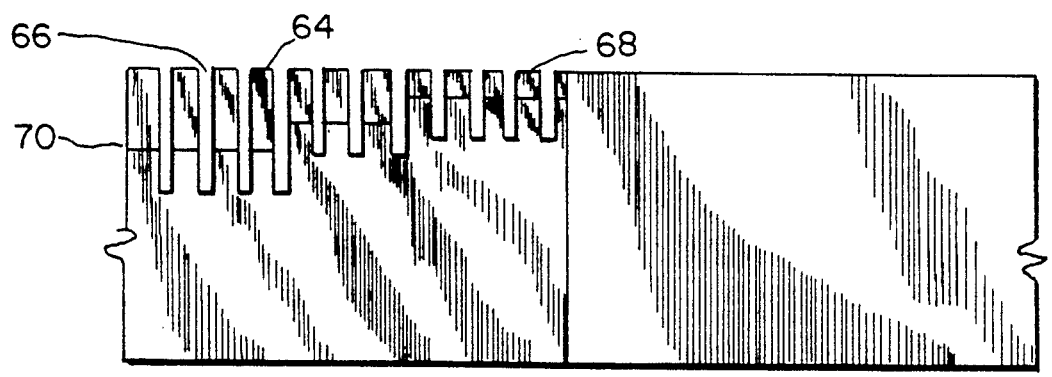
FIG. 10 illustrates a sensor having three different thicknesses.

The central elements of the graded frequency linear array [68] are thus resonant at a higher frequency than the periphery elements are. The high resonant frequency of the center corresponds to the frequency at which energy is transmitted by the ultrasonic sensor. The lower resonant frequency of the peripheral elements corresponds to the lowest frequency which is expected to be received by the sensor array. The alternative embodiment of the invention is not limited to one thickness change. FIG. 10 illustrates a sensor having three different thicknesses. The number of thickness steps can be increased, resulting in a corresponding increase in the number of resonant frequencies.

What is claimed is:

1. An ultrasonic annular array sensor comprising:
   an ultrasonic sensor [10] having a shape which approximates a right circular cylinder cut from a spherical shell of piezoelectric material; said shell having
   (1) a center [12];
   (2) a concave side [14];
   (3) a convex side [16];
   (4) a central portion [18], said central portion having a central thickness dimension [26]; and
   (5) a peripheral portion [20], said peripheral portion having a peripheral thickness dimension, said central thickness dimension [26] being smaller than said peripheral thickness dimension.

2. A method of forming an ultrasonic annular array sensor by:
   a. cutting a generally cylindrical section from a spherical shell of piezoelectric material said section having a concave and a convex surface;
   b. removing material from a central cylindrical portion [18] of said shell;

c. coating said concave surface [14] and said convex surface [16] of said generally cylindrical section with a conductive coating;

d. applying a suitable DC voltage between said conductive coating [32] and said convex surface [14], thereby poling said piezoelectric material to form an ultrasonic transducer [10];

e. placing an impedance matching layer [34] on said concave surface [14] of said central portion [18], said impedance matching layer [34] being approximately tuned to a frequency to which said central portion [18] is resonant;

f. placing an impedance matching layer [34] on said concave surface [14] of said outermost annular portion [20], said impedance matching layer [34] being approximately tuned to a frequency to which said outermost annular portion [20] is resonant;

g. placing impedance matching layers [34] on said concave surface of any other annular portions [22], each of said impedance matching layer [34] being approximately tuned to a frequency to which said other annular portion [22] is resonant.

3. An ultrasonic annular array sensor comprising:
an approximate right circular cylinder cut from a spherical shell of piezoelectric material, said shell having concave and convex sides, a central portion and a plurality of annular portions;
said annular portions including innermost and an outermost annular portions; each of said annular portions having a thickness dimension; the innermost annular portion being smaller in said thickness dimension than the other annular thickness dimension; the outermost annular portion being larger in thickness dimension than any other annular portion, intermediate in location between the innermost annular portion and the outermost annular portion;
said central portion having a central thickness dimension which is smaller than any of said annular thickness dimensions; and
any other annular portion having thickness dimensions intermediate between a thickness of an annular portion closer to said center of the shell and a thickness of an annular portion further from the center of the shell;
wherein the values of said central thickness dimension and each of said annular thickness dimensions are respectively constant.

4. An ultrasonic annular array sensor as in claim 3, in which said thickness dimension [26] of said central portion [18] is such that said central portion is resonant at approximately a highest ultrasonic frequency transmitted by said ultrasonic annular array sensor [10].

5. An ultrasonic annular array sensor as in claim 4, in which said thickness dimension [28] of an intermediate annular portion [22] is resonant at a frequency intermediate between said highest frequency transmitted by, and said lowest frequency received by, said ultrasonic annular array sensor [10].

6. An ultrasonic annular array sensor as in claim 3, in which said thickness dimension [30] of said outermost annular portion [24] is resonant at approximately a lowest frequency received by said ultrasonic annular array sensor.

7. An ultrasonic annular array sensor [10] as in claim 6 in which said ultrasonic annular array sensor [10] comprises a plurality of annuli [32] each of which may be excited separately, said annuli [32] having been preassembled in an array having an approximate shape of a right circular cylinder cut from a spherical shell of piezoelectric material, and shell having:
    (1) a concave side [14];
    (2) a convex side [16];
    (3) a central portion [18], and
    (4) a peripheral portion [20];
so that said central portion [18] consists of a plurality of annuli [32], and said periphal portion [20] consists of a plurality of annuli [32].

8. An ultrasonic annular array sensor as in claim 3, in which said ultrasonic annular array sensor comprises a spherical shell shaped portion having an outer portion uniform thickness and a central portion of laser thickness at the convex side; and the annuli are each comprised of piezoelectric material of thinned outer thickness so that the concave side is unchanged.

9. An ultrasonic graded frequency linear array sensor comprising:
    a rectangular block of piezoelectric material, with a plurality of steps, said rectangular block including a stepped side, a smooth side, a central portion having a thickness dimension and an outermost portion having a thickness dimension;
    the outermost thickness dimension being greater than the central thickness dimension; said block having a backing applied to the stepped side and being cut into individual sensor elements by saw cuts;
    wherein said saw cut extend into said backing and the thickness dimension of the outermost annular portion is resonant at approximately a lowest frequency received by the ultrasonic graded frequency linear array sensor.

10. An ultrasonic graded frequency linear array sensor [72] as in claim 9, in which said thickness dimension [59] of said central portion [58] is such that said central portion [58] is resonant at approximately a highest ultrasonic frequency transmitted by said ultrasonic graded frequency linear array sensor ]72].

11. A method of shaping a piezoelectric material for an annular array sensor by:
    a. cutting a generally cylindrical section of uniform thickness from a spherical shell of piezoelectric material, said section having a concave and a convex surface,
    b. removing material from a central cylindrical portion of said shell by thinning the central portion of the convex side, and
    c. coating said concave surface and said convex surface of said material with a conductive coating.

* * * * *